(12) United States Patent
Carlson

(10) Patent No.: US 8,015,333 B1
(45) Date of Patent: Sep. 6, 2011

(54) METHOD AND APPARATUS FOR THE DETECTION OF THE END OF A DAISY CHAIN

(75) Inventor: John R. Carlson, Santa Clara, CA (US)

(73) Assignee: Digi International Inc., Minnetonka, MN (US)

( * ) Notice: Subject to any disclaimer, the term of this patent is extended or adjusted under 35 U.S.C. 154(b) by 2154 days.

(21) Appl. No.: 09/874,867

(22) Filed: Jun. 4, 2001

(51) Int. Cl.
*G06F 13/00* (2006.01)
*G06F 3/00* (2006.01)
*G06F 13/42* (2006.01)

(52) U.S. Cl. .............. 710/100; 710/15; 710/17; 710/19; 710/106

(58) Field of Classification Search ............... 710/15, 710/18, 65, 66, 100, 300, 19, 38, 62, 106, 710/301, 303, 105, 305, 17; 326/30; 377/64; 709/251
See application file for complete search history.

(56) References Cited

U.S. PATENT DOCUMENTS

| | | | | |
|---|---|---|---|---|
| 4,670,880 A * | 6/1987 | Jitsukawa et al. | ............. | 714/797 |
| 5,201,038 A * | 4/1993 | Fielder | ............. | 710/100 |
| 5,742,579 A * | 4/1998 | Kazuno et al. | ............. | 369/124.07 |
| 5,784,644 A * | 7/1998 | Larabell | ............. | 710/9 |
| 5,920,266 A * | 7/1999 | Allgood et al. | ............. | 710/300 |
| 5,926,031 A * | 7/1999 | Wallace et al. | ............. | 326/30 |
| 6,025,708 A * | 2/2000 | Stickler | ............. | 324/158.1 |
| 6,041,373 A * | 3/2000 | Pham | ............. | 710/62 |
| 6,047,347 A * | 4/2000 | Hansen et al. | ............. | 710/307 |
| 6,174,196 B1 * | 1/2001 | Pongracz et al. | ............. | 439/502 |
| 6,493,776 B1 * | 12/2002 | Courtright et al. | ............. | 710/110 |
| 6,537,109 B1 * | 3/2003 | Emery | ............. | 439/638 |
| 6,629,181 B1 * | 9/2003 | Alappat et al. | ............. | 710/300 |
| 6,704,277 B1 * | 3/2004 | Dabral et al. | ............. | 370/201 |
| 2002/0133298 A1 * | 9/2002 | Silverman | ............. | 702/19 |

OTHER PUBLICATIONS

Microsoft Press Computer Dictionary, 3rd Edition, 1997. pp. 128 [daisy chain] and 423-424 [SCSI bus, SCSI chain, SCSI ID].*
"Etherlink III Parallel Tasking 16-Bit ISA Network Interface Controller User Guide". 3com Corporation Copyright 1997. Pages 2-5 through 2-6.*

* cited by examiner

*Primary Examiner* — Thomas J Cleary
(74) *Attorney, Agent, or Firm* — Heimlich Law, PC; Alan Heimlich, Esq.

(57) ABSTRACT

A method and apparatus for detecting the end of a daisy chain are described. A node receives an M-wide bit input, terminates K bits of the input, shifts and outputs the remaining M-K bits, and drives from the node K bits onto the output.

6 Claims, 10 Drawing Sheets

METHOD AND APPARATUS FOR THE DETECTION OF THE END OF A DAISY CHAIN

FIELD OF THE INVENTION

The present invention pertains to the encoding and sensing of information. More particularly, the present invention relates to a method and apparatus for detecting the end of a daisy chain.

BACKGROUND OF THE INVENTION

There are many techniques of collecting distributed data. Some techniques use a single wire protocol. This requires each node supplying data or information be addressed prior to obtaining information from it. This can cause delays in obtaining the information and the information between two nodes may be unrelated in time. Therefore, it is often desirable to obtain information from multiple nodes in parallel. The information obtained from all of the nodes may be obtained at the same time and conclusions may be made about inter-node conditions. In addition, parallel interfaces to multiple nodes, often increases the rate that all nodes can be sampled.

In a parallel scheme, you may have n nodes of k bits of information producing an n*k bit parallel result. Thus, node n may provide the information in, for example, bits [n*k−1, n−1] of the parallel result. There are several ways this information may be collected. One method is to have a k bit interconnect between the node and the receiver. Another method is to have an n*k bit interconnect that daisy chains (also spelled: daisychains and daisy-chains) from node to node and terminating at a receiver. This second method has the advantage that it often simplifies node to node connections, for example, using wires connecting the distributed nodes. Common examples of where daisy chain connections are used is FireWire (IEEE1394), SCSI (Small Computer System Interface), USB (Universal Serial Bus), etc.

When interconnecting daisy chained nodes it is also desirable to make each node the same in all respects so that they may be mass-produced and easily connected. A common way of making each node the same is by having the node always produce the bits at a common place in the parallel result, say [k−1,0], and shifting the incoming bits from the other nodes as follows: [(n−1)*k−1;0]→4[n*k−1,k].

This shifting by each node of the bits coming from other nodes allows each node to be physically the same and the position of the node in the daisy chain effectively defines the position of the data in the parallel result.

The daisy chain interconnection method often makes assembly of many nodes easy. One simply hooks the next node up to the previous one. The first node is hooked up to the receiver. This can continue up to n nodes. However, there is nothing to prevent hooking up more than n nodes. The result is that the information from the nodes farther from the receiver than the nth node is not going to reach the receiver and will be lost.

Thus, a common problem is determining the maximum number of devices that may be daisy chained together in a single chain or when that limit has been reached.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
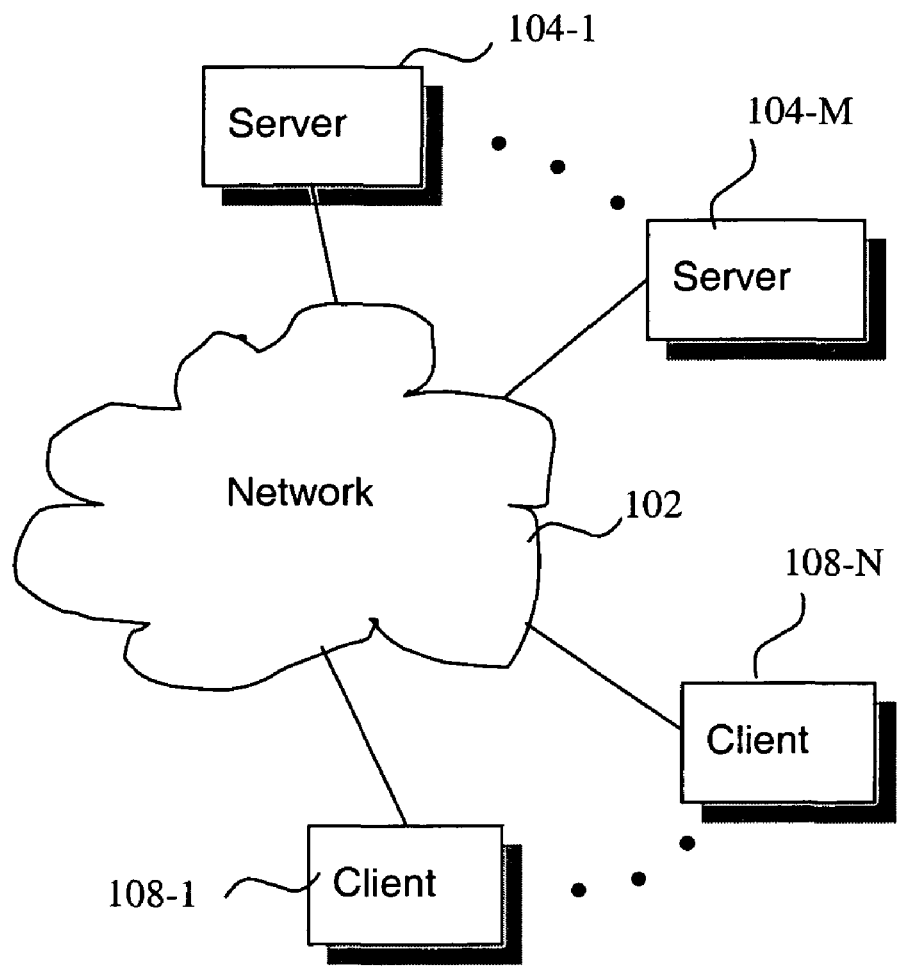
FIG. 1 illustrates a networked computer environment.

A method and apparatus for the detection of the end of a daisy chain are described.

For purposes of discussing the invention, it is to be understood that various terms are used by those knowledgeable in the art to describe techniques and approaches.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits possibly within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Similarly, one skilled in the art would recognize bit notation, such as [D7, . . . , D0] as representing 8 bit locations in a byte with D0 being the least significant bit and D7 being the most significant bit. Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 1 illustrates a network environment in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
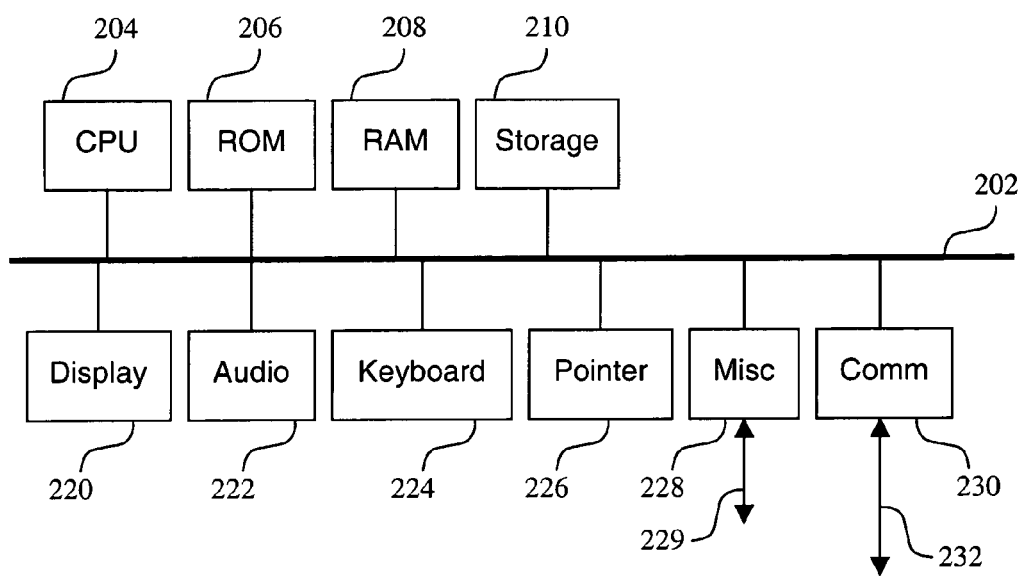
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC)

connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may have, for example, a subsystem that needs to transfer information to the Storage 210.

A particular subsystem, such as, Storage 210 may be a storage system comprised of, for example, one or more hard disks. The interconnection of the disks in such a system may be by a variety of techniques including, for example, a daisy chain. Likewise, a variety of peripheral devices may be connected to the miscellaneous input/output (I/O) device 228, through the I/O port 229. For example, a USB connection would allow several devices to be daisy chained together and interface through I/O device 228 to bus 202.

Figure 3:
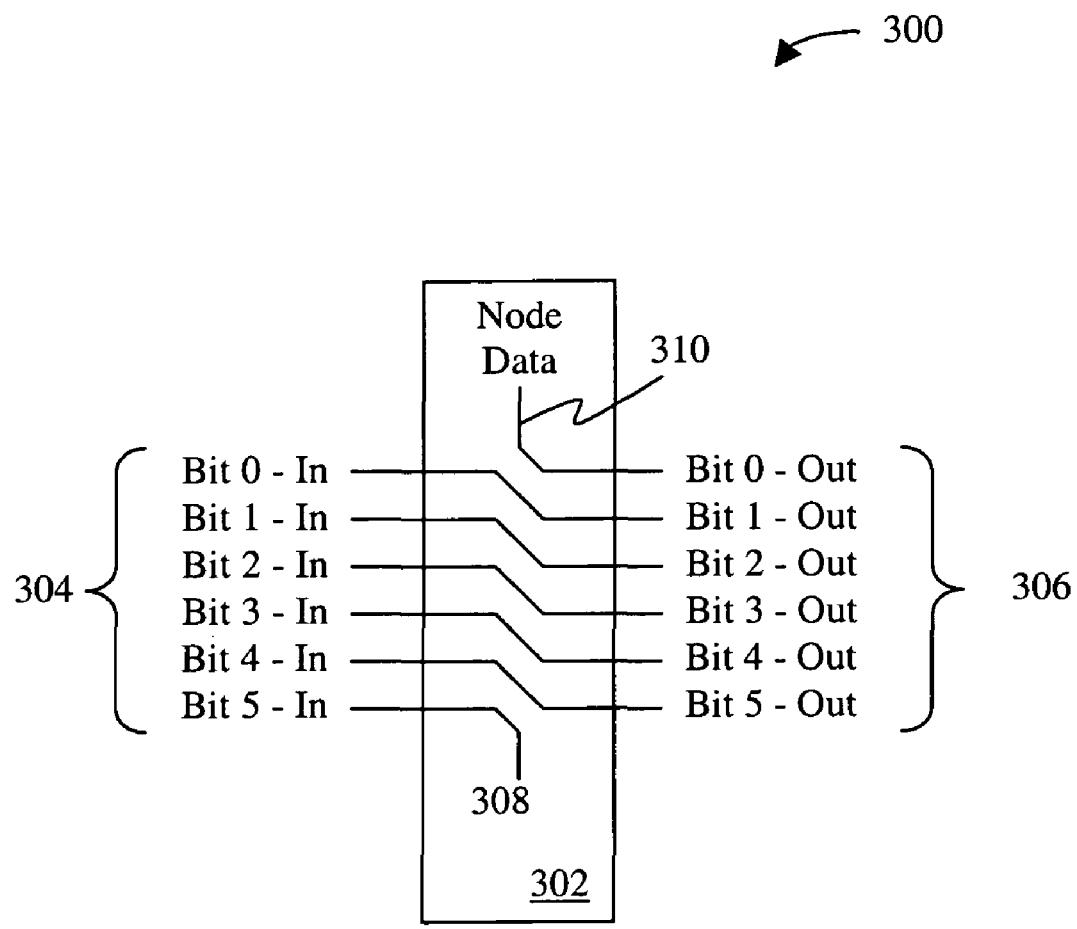
FIG. 3 illustrates one embodiment of a node.

FIG. 3 illustrates one embodiment 300 of a node 302 that may be used in a daisy chain structure. In this example, the parallel data out is 6 bits (Bit 0 through Bit 5) 306, i.e. n*k=6. The input bits (Bit 0 through Bit 5) 304 are shown shifted one bit position from input 304 to output 306 within the node 302. The number of bits per node is 1 310, i.e. k=1 and, therefore, the maximum number of nodes in a daisy chain is 6. The nodes may be conveniently numbered by the final bit position of the data they provide, i.e. nodes may be numbered from 0 to 5. In this embodiment, the node located closest to the receiver, receiving Bits 0-5 (306) is node 0 and its information appears in bit position 0 (Bit 0). If a node is connected to the left of node 0, then the new node becomes node 1. It provides information out its bit 0 position and then node 0 shifts it, in this embodiment, to bit position 1. If a 7th node is connected, the data supplied by this 7th node will not reach the receiver and is illustrated as data lost 308.

Figure 4:
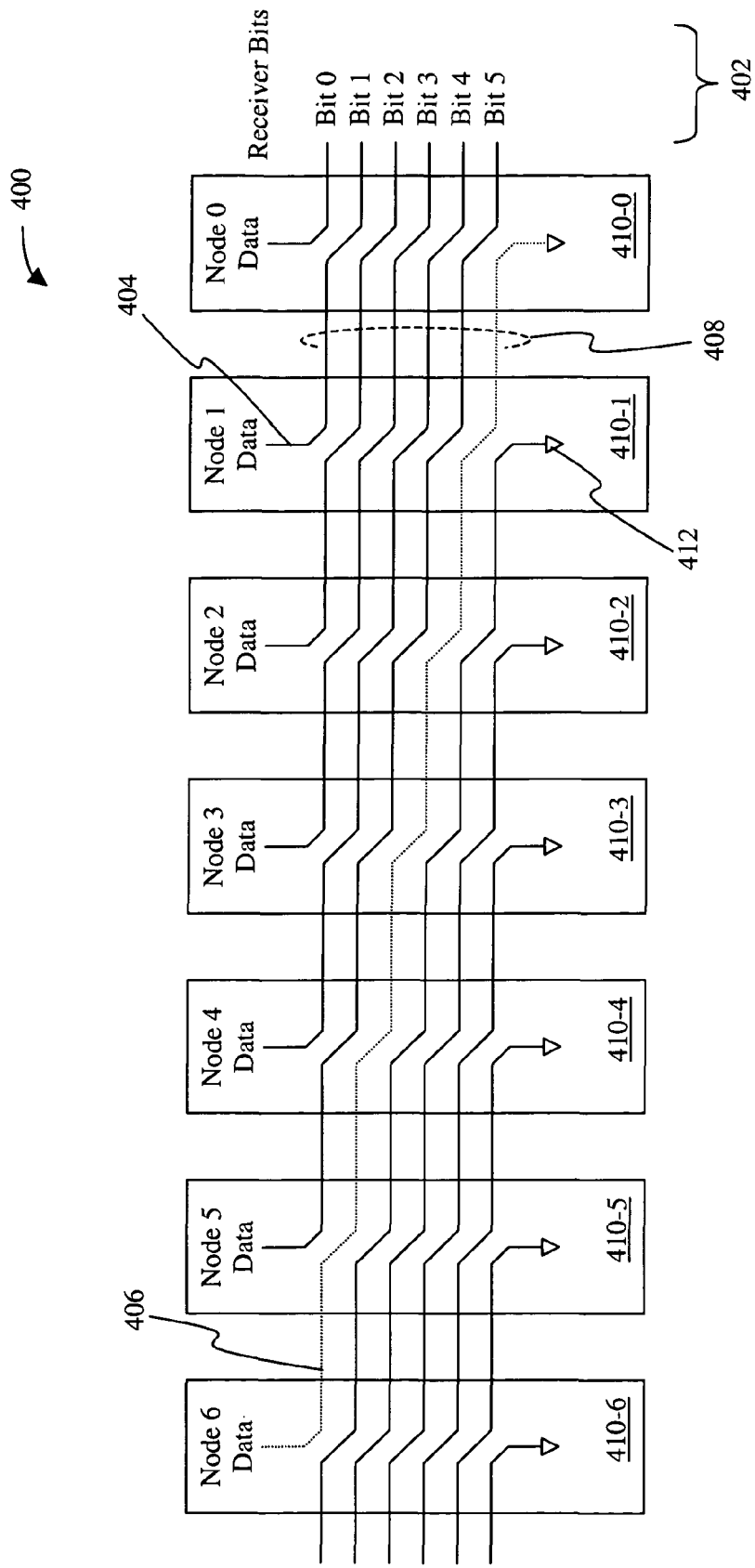
FIG. 4 illustrates one embodiment of a daisy chain.

FIG. 4 illustrates one embodiment of a daisy chain 400 with 7 nodes (410-0 through 410-6). In this embodiment, the data from each node is driven out on the lsb Bit 0 line, as for example, node 1 410-1 data at 404. Additionally, the most significant input bit to a node is driven to a 0, shown here, for example at node 1 410-1 by grounding the line at 412. The dashed line 406 shows the data from node 6 410-6 never reaches the receiver 402. Any additional nodes connected past node 6 410-6 will also not have their data received at the receiver 402.

The connection between nodes in this embodiment is via a bundle of wires, a cable, 408. The detection of the end of the daisy chain makes use of the fact that all lines past the last data line that is received by the receiver 402, may as in this embodiment, be unconnected at both ends. Use of these lines is made for sending signal information to each node connected by these lines. At any particular node, a different number of lines are available for these signals. We employ a signaling method, referred to as open collector or open drain. In this signaling technique, the driver only drives zeros (a low signal) and the receiver terminates each received bit line in a way that weakly drives a one (a high signal). For example, weakly driving a one may be a resistive element connected to a power supply. This means that a node can drive a 0 down the bit line without the possibility of damaging a node trying to drive a 1. Thus, in this embodiment, the nodes do not drive 1's.

Figure 5:
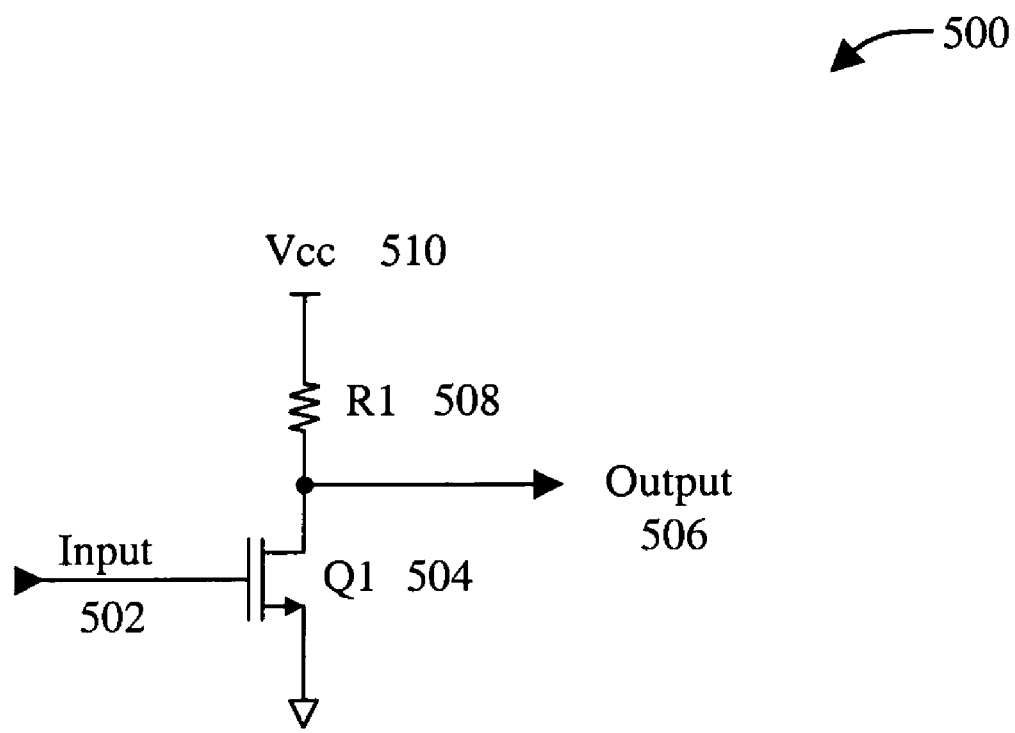
FIG. 5 illustrates one embodiment of a node data driver.

FIG. 5 illustrates one embodiment of a node data driver 500. Here the input 502, drives a transistor Q1 504 which drives the output 506. Resistor R1 508 is a high resistance connected to the output 506 and a power supply Vcc 510. R1 weakly drives the output 506 when the input 502 is at a low potential.

Figure 6:
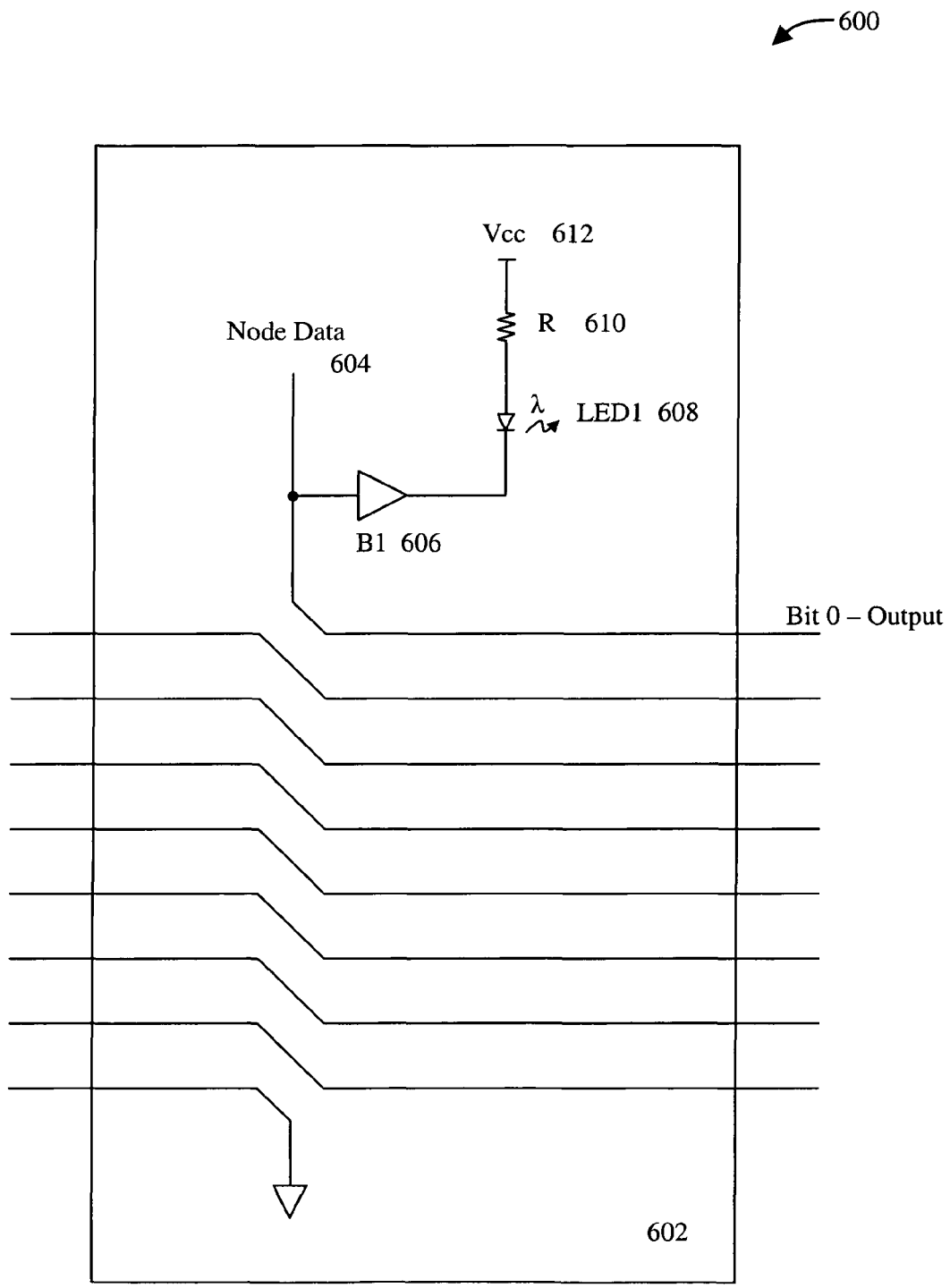
FIG. 6 illustrates one embodiment of a node indicator.

FIG. 6 illustrates one embodiment of a node indicator 600. If light emitting diode (LED) LED1 608 is on steadily then this indicates that this node's data 604 will not be E received by a receiver at the end of a daisy chain. Buffer 606 takes as input the node data 604 and drives LED1 608. Resistor R 610 is connected to a power supply Vcc 612 and LED1 608 and provides power for and limits current to LED 1 608. If for example, LED 1 were a red LED, than if the LED 1 608 was steadily on, then it would indicate that node 602's data was not being received.

Figure 7:
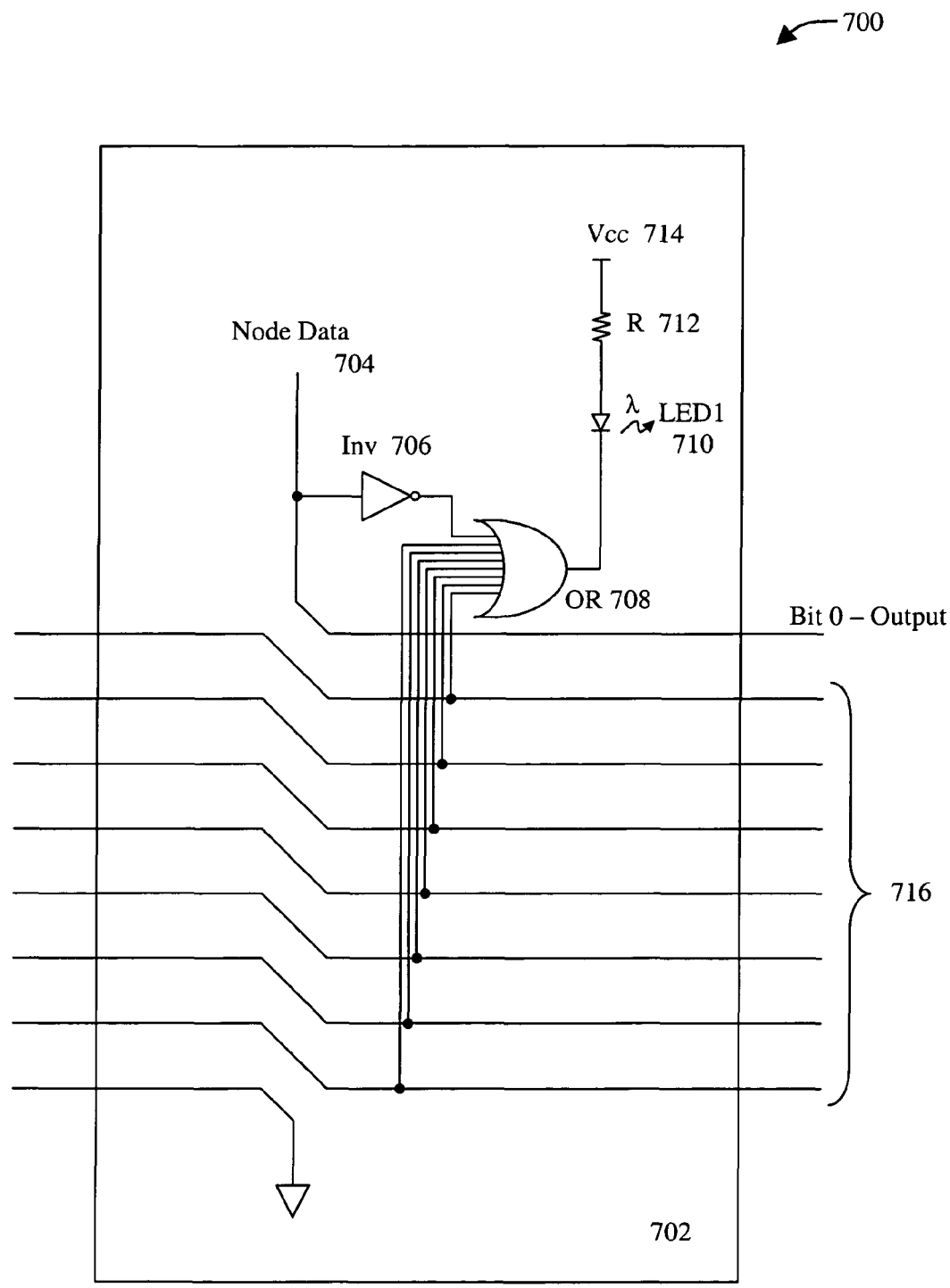
FIG. 7 illustrates another embodiment of a node indicator.

FIG. 7 illustrates another embodiment of a node indicator 700. Here, when node 702 is not driving data at 704, LED 710 lights steadily to indicate that this is the last node in a daisy chain where it's data will be received by a receiver. Inverter 706 and OR gate 708 form a logic function that will drive LED 710 on when node 702 data at 704 is a logic one and the other inputs 716 are at a logic zero. Resistor R 712 is connected to a power supply Vcc 714 and LED 710 and provides power for and limits current to LED 710.

Figure 8:
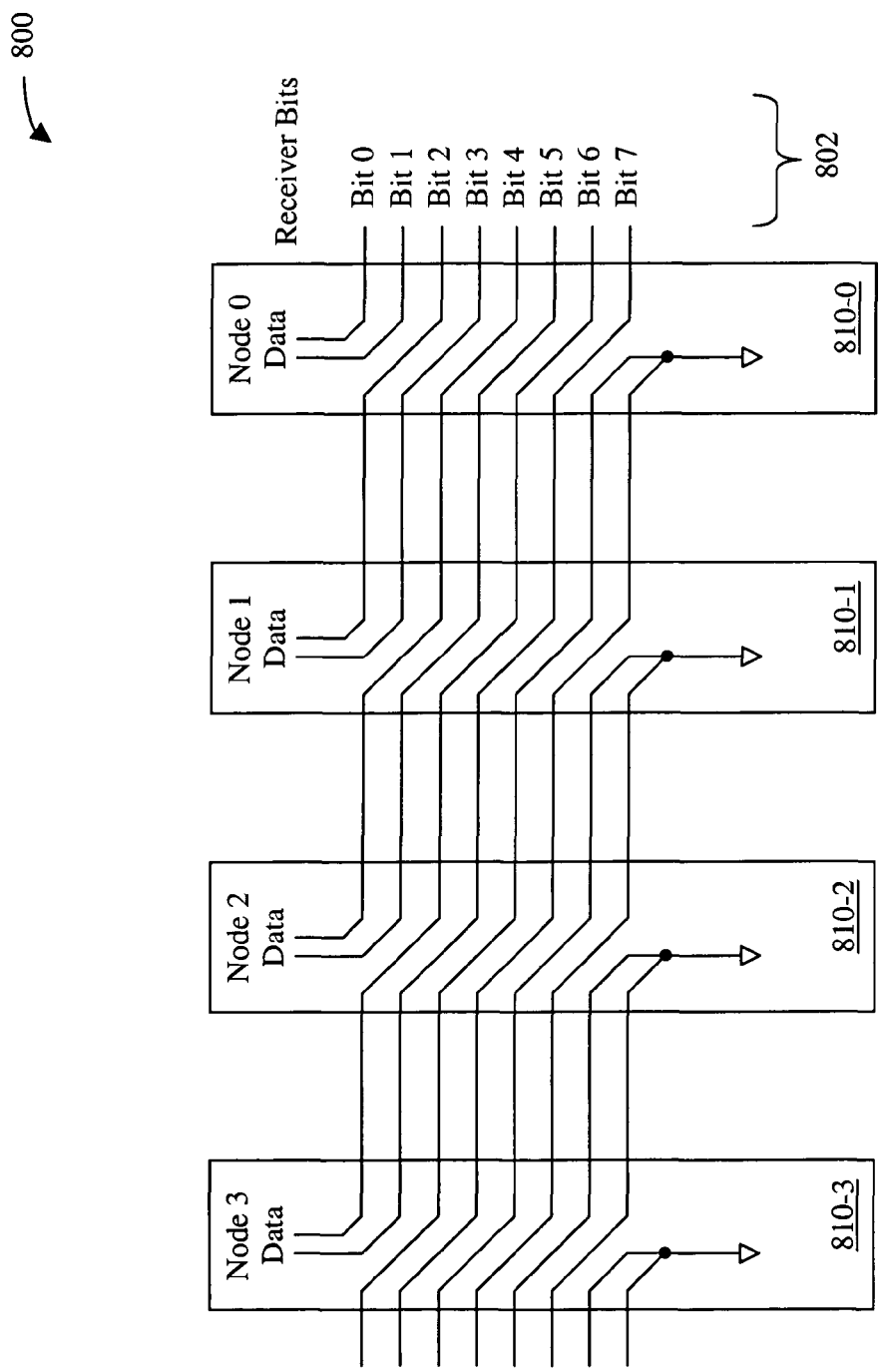
FIG. 8 illustrates another embodiment of a daisy chain.

FIG. 8 illustrates one embodiment of a daisy chain 800 with 4 nodes (810-0 through 810-3). In this embodiment, n=4 and k=2. Thus, 2 bits of data from each node are driven out on the lsb Bit 0 and Bit 1 line. Additionally, the 2 most significant input bits to a node are driven to a 0, shown here, via grounding. Thus the receiver bits 802 are 8 bits with 2 bits coming from each daisy chained node (810-0 through 810-3).

Figure 9:
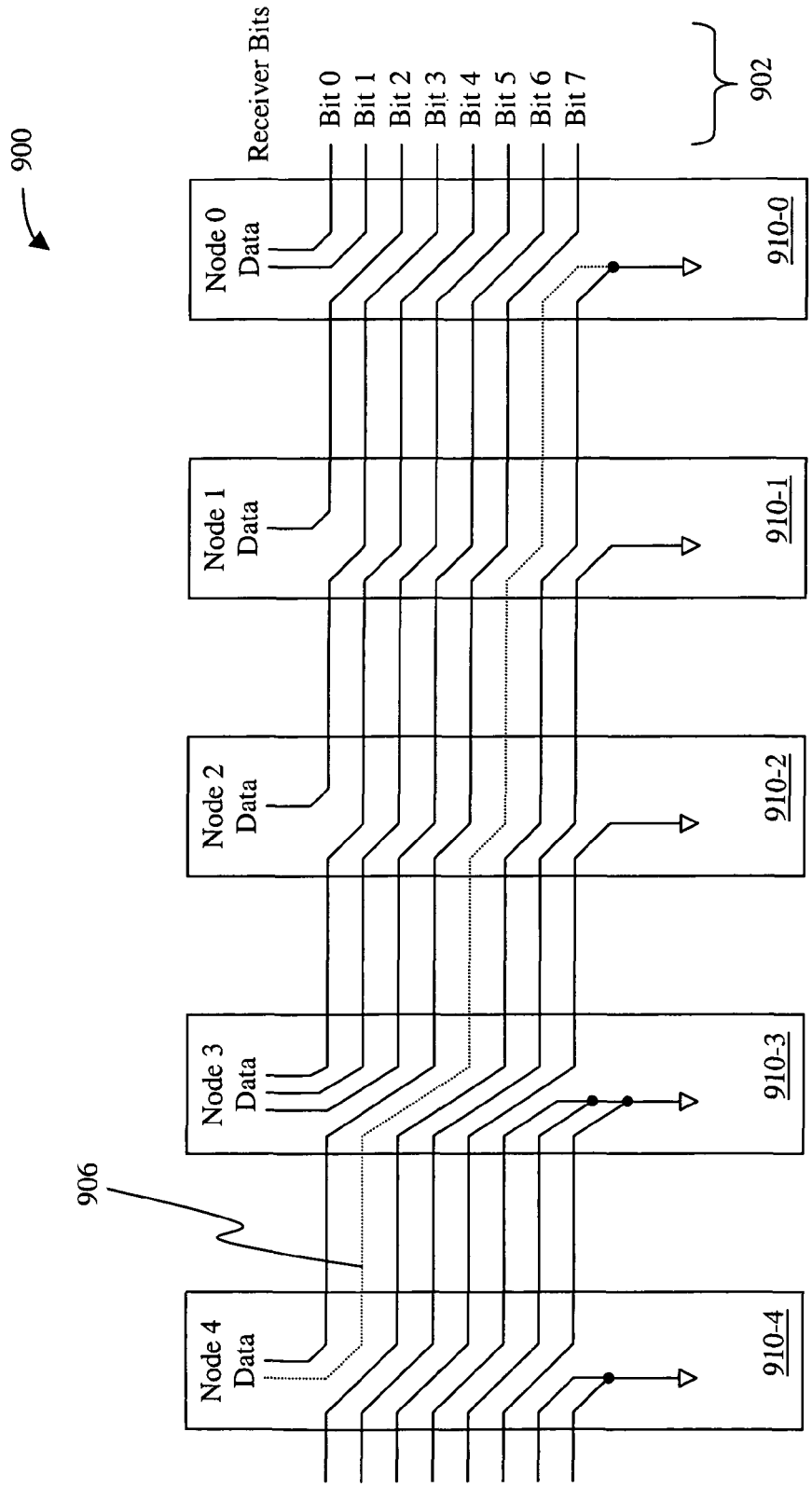
FIG. 9 illustrates another embodiment of a daisy chain where k is variable.

FIG. 9 illustrates another embodiment of a daisy chain where k is variable. Here k is not a constant but varies on a per node basis. What is to be appreciated is that k may be different for each node. Only the width of the receiver input (M), here, 8 bits, need be constant. The sum of the k's does not have to sum to M. In this embodiment, the node where the sum equals or exceeds M is indicative of a node's data not being received. Thus, FIG. 9 illustrates one embodiment of a daisy chain 900 with 5 nodes (910-0 through 910-4). In this embodiment, n=5 and node 0 has k=2, node 1 has k=1, node 2 has k=1, node 3 has k=3, and node 4 has k=2. Thus, k bits of data from each node are driven out on the lsb bit line(s). Additionally, the k most significant input bits at each node are driven to a 0, shown here, via grounding. Thus, the receiver bits 902 are 8 bits with varying k bits coming from each daisy chained node (910-0 through 910-4). However, as illustrated at 906 some Node 4 910-4 data will not be received at the receiver 902. Therefore, a node indicator at node 4 910-4 signaling this condition would be beneficial. One embodiment of such a node indicator is illustrated in FIG. 10.

Figure 10:
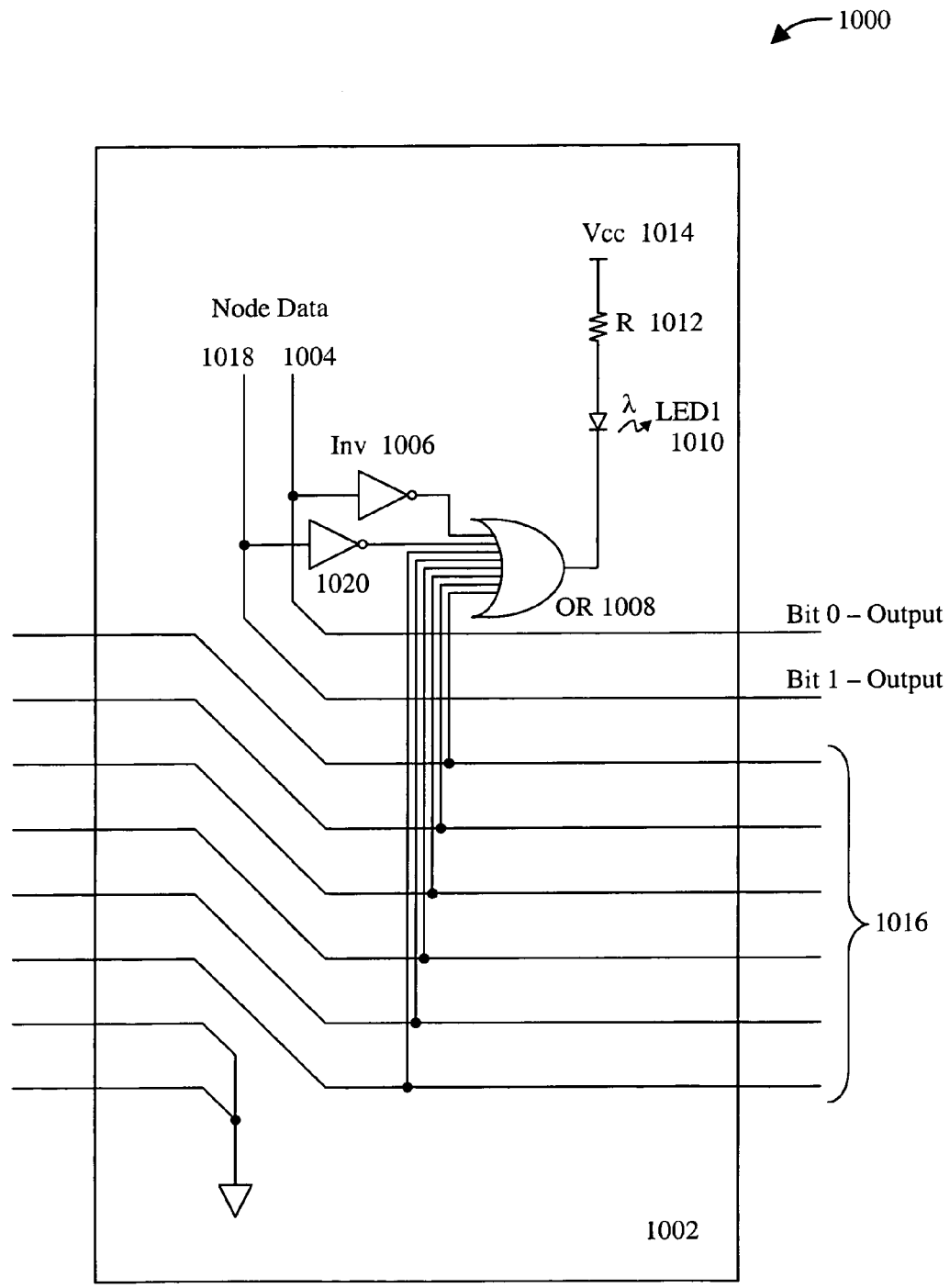
FIG. 10 illustrates another embodiment of a node indicator for use where k is variable.

FIG. 10 illustrates another embodiment of a node indicator 1000 for use where a node has k=2. As such this embodiment may be used, for example, at Node 4 910-4 as shown in FIG. 9, where k=2. Here, when node 1002 is not driving data at 1004 and 1018, LED 1010 lights steadily to indicate that this the last node in a daisy chain where it's data will be received by a receiver. Inverter 1006 and 1020, and OR gate 1008 form a logic function that will drive LED 1010 on when node 1002 data at 1004 and 1018 is a logic one and the other inputs 1016 are at a logic zero. Resistor R 1012 is connected to a power supply Vcc 1014 and LED 1010 and provides power for and limits current to LED 1010.

If the embodiment of the node indicator as illustrated in FIG. 10 was used in Node 4 910-4 of FIG. 9, then the LED 1010 would not light when the node is not driving data at 1004 and 1018, thus indicating that all the data driven from Node 4 910-4 was not being received at the receiver 902.

While FIG. 10 shows one embodiment of a node indicator for a variable k of 2, using a single LED, one skilled in the art will recognize that there are many alternative embodiments having other indicating properties. For example, two LEDs with a different sensing arrangement could be used, with one LED indicating that no more nodes can be added and another LED could indicate that data from this node is lost. Additionally, other LEDs may indicate, for example, which data lines will not be received and which ones will be received. Thus, the indicators may assist a user in determining the status of the daisy chain and may assist with information on how to re-route the nodes.

What is to be appreciated is that the node indicator for any particular node (variable k) may provide information on the status of the daisy chain. For example, the status of a daisy chain may be an indication of the end of a daisy chain, i.e. nodes past this node will not have their data received, etc. Additionally, status of the daisy chain may be status of a node as well, for example, that all, some, or none of the data from a particular node is being received, etc. Additionally, it is to be appreciated that these indicators may be on a per node basis.

Thus, a method and apparatus for detecting the end of a daisy chain have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An electrical sensing method for nodes in a daisy chain comprising:
    (a) receiving a plurality of electrical signals from a preceding node in said daisy chain, wherein said plurality of electrical signals represents a first quantity, said first quantity including each and every one of said plurality of electrical signals, and wherein one of said plurality of electrical signals is a least significant electrical signal, and wherein except for said one of said plurality of electrical signals another one of said plurality of electrical signals is a most significant electrical signal;
    (b) electrically terminating one or more of said plurality of electrical signals, starting said electrical termination at a significant end, wherein said electrically terminated said one or more of said plurality of electrical signals represents a second quantity, said second quantity including each and every one of said electrically terminated said one or more of said plurality of electrical signals;
    (c) performing a shift of second quantity bit positions on each of said plurality of electrical signals except for said electrically terminated said one or more of said plurality of electrical signals;
    (d) outputting said shifted each of said plurality of electrical signals except for said electrically terminated said one or more of said plurality of electrical signals at a first set of output positions to a following node in said daisy chain;
    (e) outputting a third quantity of new electrical signals at a second set of output positions to said following node in said daisy chain, wherein said third quantity is equal in number to said second quantity; and
    (f) electrically sensing an electrical state of only one of said third quantity of new electrical signals.

2. The method of claim 1 further comprising (g) providing an optical output based on said electrically sensed electrical state of said only one of said third quantity of new electrical signals.

3. An electrical sensing method for nodes in a daisy chain comprising:
    (a) receiving a plurality of electrical signals from a preceding node in said daisy chain, wherein said plurality of electrical signals represents a first quantity, said first quantity including each and every one of said plurality of electrical signals, and wherein one of said plurality of electrical signals is a least significant electrical signal, and wherein except for said one of said plurality of electrical signals another one of said plurality of electrical signals is a most significant electrical signal;
    (b) electrically terminating one or more of said plurality of electrical signals, starting said electrical termination at a significant end, wherein said electrically terminated said one or more of said plurality of electrical signals represents a second quantity, said second quantity including each and every one of said electrically terminated said one or more of said plurality of electrical signals;
    (c) performing a shift of second quantity bit positions on each of said plurality of electrical signals except for said electrically terminated said one or more of said plurality of electrical signals;
    (d) outputting said shifted each of said plurality of electrical signals except for said electrically terminated said one or more of said plurality of electrical signals at a first set of output positions to a following node in said daisy chain;
    (e) outputting a third quantity of new electrical signals at a second set of output positions to said following node in said daisy chain, wherein said third quantity is equal in number to said second quantity;
    (f) electrically sensing a first electrical state of said third quantity of new electrical signals;
    (g) electrically sensing a second electrical state of said each of said plurality of electrical signals except for said electrically terminated said one or more of said plurality of electrical signals and
    (h) electrically combining said first electrical state and said second electrical state to produce a single electrical signal indicating a state of said shifted each of said plurality of electrical signals except for said electrically terminated said one or more of said plurality of electrical signals and said new electrical signals.

4. The method of claim 3 further comprising (i) providing an optical output based on said electrically sensed first electrical state and no optical output based on said electrically sensed second electrical state.

5. The method of claim 3 further comprising inverting only said third quantity new electrical signals.

6. A method for detecting if data at any of two or more bit positions presented in a daisy chained node is not received at a daisy chain receiver, said method comprising:

receiving at said daisy chained node an input consisting of a plurality of inputs;

shifting by two or more bit positions said plurality of inputs;

outputting from said daisy chained node an output consisting of said shifted by two or more bit positions said plurality of inputs and said data at two or more bit positions presented in said daisy chained node;

grounding electrically two or more of said plurality of inputs; and generating based on said output a signal indicative of one or more of said data at any of two or more bit positions presented in said daisy chained node not being received at said daisy chain receiver.

\* \* \* \* \*